2,780,308

COMPOSITION FOR COATING AIR FILTERS

William B. Mullin, Alhambra, and Charles E. Painter, Whittier, Calif., assignors, by mesne assignments, to Socony Mobil Oil Company, Inc., a corporation of New York No Drawing. Application December 22, 1953, Serial No. 399,830

4 Claims. (Cl. 183—44)

This invention relates to means for removing solid particles from streams of air and other gases.

The usual method of removing dust, sand, lint, insects, etc. from a gaseous stream is to pass the stream through a chamber having a large area of adhesive surfaces interposed in the path of the gas. The surfaces are ordinarily provided by means of screens, baffles, or loosely packed ribbons or filaments (usually metallic) coated with a liquid or semi-liquid. Such filters are employed at the air intakes of internal combustion motors and for numerous other purposes.

The liquid has in many cases been chosen from the viscous, nonvolatile mineral oils such as heavy lubricant stocks. These have not been fully satisfactory. If the liquid is extremely viscous, it engulfs adherent particles so slowly that the filter is at times partially inoperative because of crusts of dirt over the liquid surfaces. But if the liquid is less viscous, it flows away from the filter surfaces, leaving only a thin film which is insufficient in quantity to engulf many solid particles. Oils of intermediate viscosity are used with fairly good results, but they exhibit both disadvantages to a considerable degree.

It is known to modify the properties of air-filter oils by the use of colloidally dispersible additives such as metallic soaps and polymeric organic substances. Compositions made in this manner have been employed with varying degrees of success.

We have found that a composition consisting of a microcrystalline petroleum wax and a mineral oil which is only moderately viscous yields excellent results as an air-filter oil. This composition has a gel-like consistency which superficially resembles that of a composition formed with an oil and a colloidal additive, but actually it is quite different. The wax forms a sponge-like structure of extremely delicate microscopic needles, with the interstices filled with oil in the state of a true liquid. The composite material is capable of clinging to solid objects as a permanently thick layer, and yet it quickly coats small adherent particles with oil and continuously presents an adhesive surface to the stream of air flowing through an air filter.

Oils which have been sufficiently gelled by colloidal additives to have similar apparent consistency suffer from one or more of a number of disadvantages. The liquid may be so firmly held in the gel structure that it has little tendency to emerge and flow over the surfaces of adherent particles, or the composition may be difficult to apply to filter surfaces at convenient temperatures, or it may lack stability in the presence of water or other elements of the operating environment. We have investigated many such compositions, and we have found none to be as satisfactory in every respect as the pseudo-gel made with microcrystalline wax.

The preferred proportion of microcrystalline wax is in the range 12% to 15% by weight with respect to the total composition. However, we have found that proportions of wax within the range of about 5% to about 25% yield products which are superior to the conventional oil compositions employed in air filters.

In order that the liquid oil phase of the composition have sufficient adhesiveness to entrap solid particles and sufficient fluidity to coat them quickly with liquid, the viscosity of the oil used in manufacturing the composition should be between 100 and 2500 seconds Saybolt Universal at 100° F., or, measured at the more convenient temperature of 210° F., between 40 and 100 seconds. Furthermore, the oil should be substantially without volatility at atmospheric temperatures, a property which is associated with a flash point of at least 350° F.

Specific examples of the compositions we employ are as follows:

Example I

| | |
|---|---|
| Wax "A"_____percent by weight__ | 15 |
| Oil "A"_____do____ | 20 |
| Oil "B"_____do____ | 39 |
| Oil "C"_____do____ | 26 |
| Flash point, ° F_____ | 420 |
| Pour point, ° F_____ | +80 |
| Viscosity, SSU at 100° F_____ | 2820 |
| Viscosity, SSU at 210° F_____ | 67 |

Example II

| | |
|---|---|
| Wax "B"_____percent by weight__ | 12 |
| Oil "A"_____do____ | 20 |
| Oil "B"_____do____ | 41 |
| Oil "C"_____do____ | 27 |
| Flash point, ° F_____ | 415 |
| Pour point, ° F_____ | +80 |
| Viscosity, SSU at 100° F_____ | 2864 |
| Viscosity, SSU at 210° F_____ | 60.8 |

Example III

| | |
|---|---|
| Wax "B"_____percent by weight__ | 6 |
| Oil "D"_____do____ | 25 |
| Oil "E"_____do____ | 69 |
| Flash point, ° F_____ | 415 |
| Pour point, ° F_____ | +75 |
| Viscosity, SSU at 100° F_____ | 2308 |
| Viscosity, SSU at 210° F_____ | 74.4 |

Waxes "A" and "B" are microcrystalline petroleum waxes having properties as follows:

| | Wax "A" | Wax "B" |
|---|---|---|
| Gravity (A. P. I.) | 33.0 | 36.0 |
| Color | 150–200 (Lov.) 3 | (ASTM). |
| Flash point | 500° F | 460° F. |
| Melting point | 160° F | 155° F. |
| Penetration at 77° F. (needle) | 20–30 | 22–32. |
| Viscosity, SSU at 210° F | 115–125 | 70. |

The various oils employed have properties as follows:

| Oil | Gravity, A. P. I. | Flash Point | Pour Point | Viscosity at 100° F. | Viscosity at 210° F. |
|---|---|---|---|---|---|
| "A" | 9.3 | 410 | +35 | 6,554 | 93.6 |
| "B" | 30.1 | 400 | 10 | 150 | 42.0 |
| "C" | 17.2 | 480 | 20 | 6,818 | 156.0 |
| "D" | 32.5 | 370 | +25 | 100 | 40.3 |
| "E" | 19.8 | 500 | +20 | 4,225 | 150.0 |

Oil "A" is a furfural extract from California lubricant stock. Oils "B" and "D" are paraffinic solvent-refined neutral oils. Oil "C" is a California heavy cylinder oil. Oil "E" is a naphthenic bright stock.

The compositions are manufactured by agitating the ingredients in a tank or kettle at about 200° to 250° F. until a uniform mixture is achieved. The use of a plurality of oils is merely a convenient way of obtaining an oil phase of the desired viscosity; a single unblended oil having the correct viscosity and lack of volatility would be quite satisfactory. The use of a furfural extract as in Examples I and II is of value because it yields a smoother product than is otherwise readily obtainable, but this feature is not essential.

In a test to measure retention of these products upon air-filter surfaces, filter screens having the dimensions 7 x 7 x 2 inches where dipped in the products at 140° F., blown with air to remove excess amounts of clinging material, and then allowed to stand at a 45° angle at temperatures of 75° F. and 140° F. In a comparative test of the composition of Example I with a commercial product considered to be representative of the best air-filter saturants now on the market, the following results were observed:

|  | Initial weight | After 24 hrs. | After 48 hrs. | After 72 hrs. | After 96 hrs. | After 144 hrs. |
|---|---|---|---|---|---|---|
| At 75° F.: |  |  |  |  |  |  |
| Example I | 99 | 99 | 99 | 99 | 99 | 99 |
| Commercial Product | 69 | 41 | 37 | 31 | ------ | 30 |
| At 140° F.: |  |  |  |  |  |  |
| Example I | 74 | 49 | 48 | 45 | 44 | 42 |
| Commercial Product | 69 | 17 | 17 | 17 | 15 | 15 |

The material of Example I is at least as good as the commercial product with respect to the property of continuously presenting an adhesive surface to heavily dust-laden air, and Examples II and III are closely equivalent to Example I as regards both properties.

We claim as our invention:

1. A filter for removing suspended materials from a gaseous stream which comprises: a chamber provided internally with a large area of surfaces interposed in the path of a gaseous stream directed through said chamber, and an adhesive coating upon said surfaces consisting of 5 to 25% of microcrystalline petroleum wax having a melting point of at least about 150° F. and an oil having a viscosity of between 40 and 100 seconds Saybolt Universal at 210° F. and having a flash point of at least 350° F.

2. A filter for removing suspended materials from a gaseous stream which comprises: a chamber provided internally with a large area of surfaces interposed in the path of a gaseous stream directed through said chamber, and an adhesive coating upon said surfaces consisting of 12 to 15% of microcrystalline petroleum wax having a melting point of at least about 150° F. and an oil having a viscosity of between 40 and 100 seconds Saybolt Universal at 210° F. and having a flash point of at least 350° F.

3. A composition for coating the surfaces of air filters, consisting of: 5 percent to 25 percent by weight of microcrystalline petroleum wax having a melting point of at least about 150° F., and an oil having a viscosity of between 40 and 100 seconds Saybolt Universal at 210° F. and having a flash point of at least 350° F.

4. A composition for coating the surfaces of air filters, consisting of: 12 percent to 15 percent by weight of microcrystalline petroleum wax having a melting point of at least about 150° F., and an oil having a viscosity of between 40 and 100 seconds Saybolt Universal at 210° F. and having a flash point of at least 350° F.

References Cited in the file of this patent

UNITED STATES PATENTS

| 2,579,984 | Trowbridge | Dec. 25, 1951 |
| 2,627,938 | Frohmader | Feb. 10, 1953 |
| 2,661,318 | MacLaren et al. | Dec. 1, 1953 |